United States Patent
Howardson et al.

(10) Patent No.: US 12,109,680 B2
(45) Date of Patent: Oct. 8, 2024

(54) SYSTEM COMPRISING HANDHELD TOOL AND WINGED PIN FOR SINGLE-USER COUPLING OF TRACTOR DRAWBAR TO IMPLEMENT HITCH TONGUE AND RELATED METHOD

(71) Applicants: Kurtis Wade Howardson, Lundar (CA); Daniel Byron Sixten Hilding Lindell, Erkisdale (CA)

(72) Inventors: Kurtis Wade Howardson, Lundar (CA); Daniel Byron Sixten Hilding Lindell, Eriksdale (CA); Brent Evashenko, Headingly (CA)

(73) Assignee: Kurt Wade Howardson, Lundar (CA)

( * ) Notice: Subject to any disclaimer, the term of this patent is extended or adjusted under 35 U.S.C. 154(b) by 157 days.

(21) Appl. No.: 17/725,988

(22) Filed: Apr. 21, 2022

(65) Prior Publication Data
US 2022/0339776 A1 Oct. 27, 2022

Related U.S. Application Data

(60) Provisional application No. 63/177,538, filed on Apr. 21, 2021.

(51) Int. Cl.
*B60D 1/02* (2006.01)
*B25J 1/00* (2006.01)
(Continued)

(52) U.S. Cl.
CPC ................ *B25J 1/00* (2013.01); *B60D 1/025* (2013.01); *B60D 1/52* (2013.01); *B60D 1/58* (2013.01); *B25B 13/06* (2013.01); *B60D 1/02* (2013.01)

(58) Field of Classification Search
CPC . B60D 1/02; B60D 1/025; B60D 1/52; B60D 1/06; B60D 1/28; B60D 1/58;
(Continued)

(56) References Cited

U.S. PATENT DOCUMENTS 3,423,781 A * 1/1969 Henson .................... A47L 13/24
24/651
4,398,322 A * 8/1983 Ewen ...................... F16B 21/04
D8/382

(Continued)

OTHER PUBLICATIONS

Device Set for Installing a Sensor Unit in a Pressurised Fluid Conduit or for Removing the Sensor Unit and Method for Same; Document ID: EP 3505304 B1; Date Published: Sep. 2, 2020; Nventor Name: Jermann Dieter; Date Filed: Dec. 27, 2017 (Year: 2020).*

(Continued)

*Primary Examiner* — Mahdi H Nejad
(74) *Attorney, Agent, or Firm* — Adrian D. Battison; Ade & Company Inc.; Ryan W. Dupuis

(57) ABSTRACT

A system and method for hitching, using a swivel pin, a tractor with a drawbar and a towable implement comprise a handheld tool for inserting the swivel pin through a pin-receiving portion of the drawbar and a hitch tongue of the implement when arranged in an aligned coupling configuration. The handheld tool has an upper end configured for gripping by a user and a lower end configured to removably receive the swivel pin. Furthermore, the handheld tool is configured to extend from the operator cab of the tractor to the pin-receiving portion of the drawbar of the tractor so that the handheld tool is usable by the operator to hitch the tractor and the implement with the swivel pin without leaving the operator cab. A novel swivel pin with arms for (Continued)

mating engagement with a receptacle in the lower end of the tool enables the pin to be rotationally releasably secured therein.

8 Claims, 6 Drawing Sheets

(51) Int. Cl.
  *B60D 1/52* (2006.01)
  *B60D 1/58* (2006.01)
  *B25B 13/06* (2006.01)
(58) Field of Classification Search
  CPC ....... B60D 1/60; B25B 13/5091; B25B 13/06; A01B 59/042
  USPC ..... 280/515, 507; 81/124.2, 177.2; 24/595.1
  See application file for complete search history.

(56) References Cited

U.S. PATENT DOCUMENTS

| | | | | |
|---|---|---|---|---|
| 5,915,482 | A * | 6/1999 | Carruthers | A01B 1/227 403/348 |
| 6,126,359 | A * | 10/2000 | Dittrich | F16B 7/20 403/325 |
| 6,282,989 | B1 * | 9/2001 | Sorter | B25B 21/002 81/57.13 |
| 6,357,780 | B1 * | 3/2002 | Young | B60D 1/485 280/506 |
| 6,925,686 | B2 * | 8/2005 | Heathcock | B25G 1/04 16/427 |
| 7,347,467 | B2 * | 3/2008 | Theobald | B62D 53/0857 294/24 |
| 8,794,111 | B2 * | 8/2014 | Wang | B25B 23/1427 81/475 |
| 9,931,721 | B2 * | 4/2018 | Buchner | B23B 51/12 |
| 10,029,522 | B1 * | 7/2018 | Gerhardt | B60D 1/025 |
| 10,556,472 | B2 * | 2/2020 | Faust | B60D 1/02 |
| 2001/0054807 | A1 * | 12/2001 | Homan | B60D 1/02 280/515 |
| 2010/0215428 | A1 * | 8/2010 | Trice | B25G 3/14 403/377 |
| 2015/0314435 | A1 * | 11/2015 | Oswald | B25J 1/04 294/175 |
| 2018/0304706 | A1 * | 10/2018 | Hruska | B60D 1/02 |
| 2021/0331537 | A1 * | 10/2021 | Baik | B60D 1/488 |

OTHER PUBLICATIONS

A High Torque Force Sleeve Spanner; Document ID: CN 108908190 A; Date Published: Nov. 30, 2018; Nventor Name: Chen, Wei-Ming (Year: 2018).*

* cited by examiner

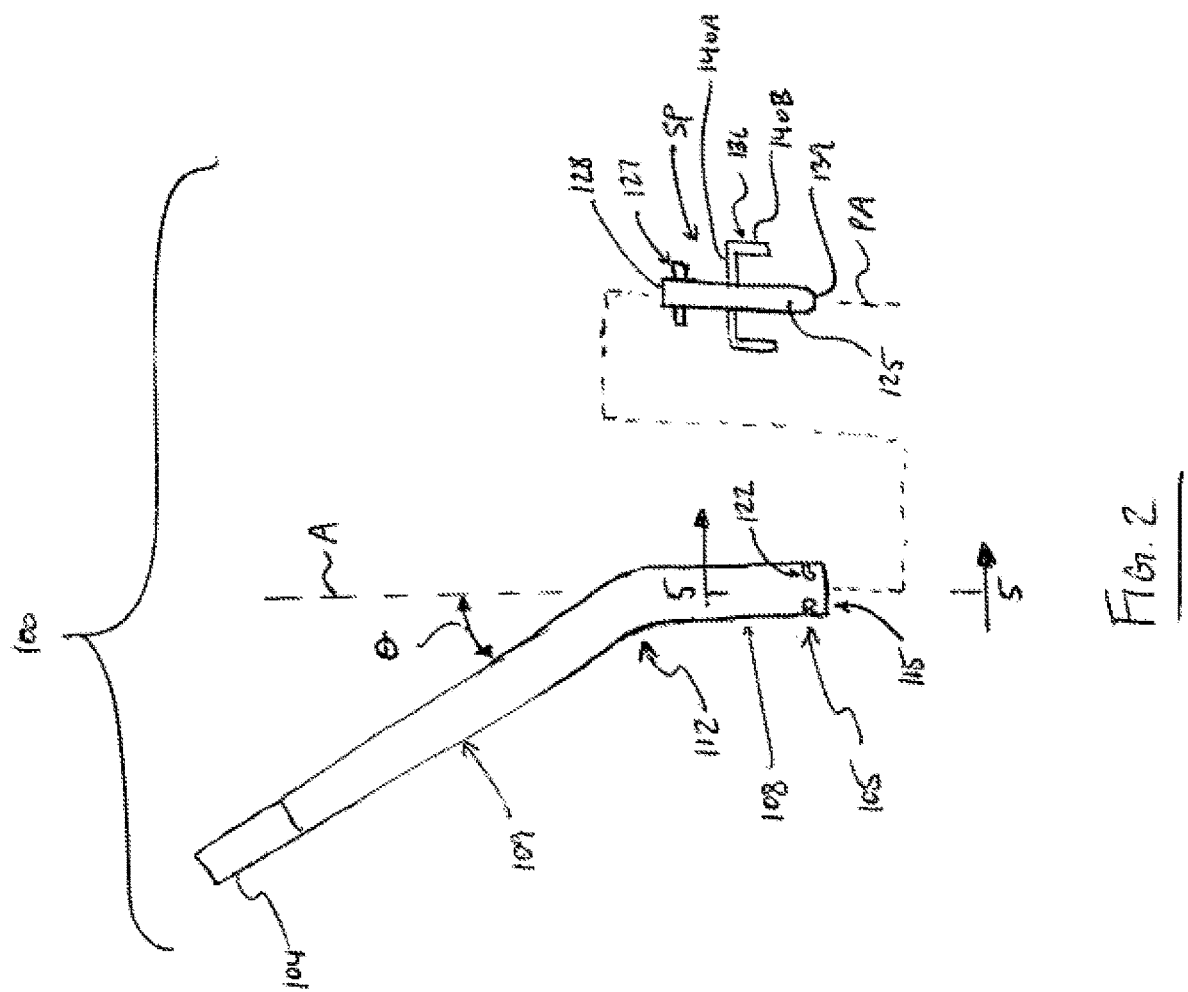

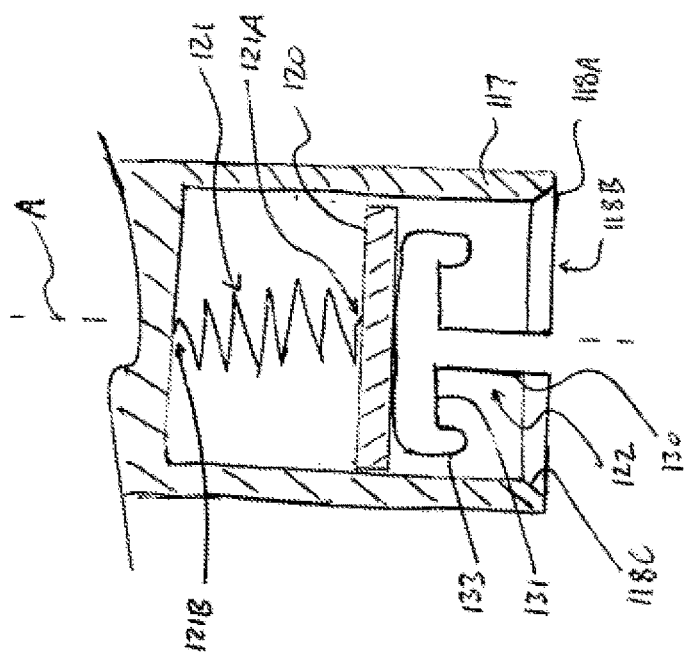
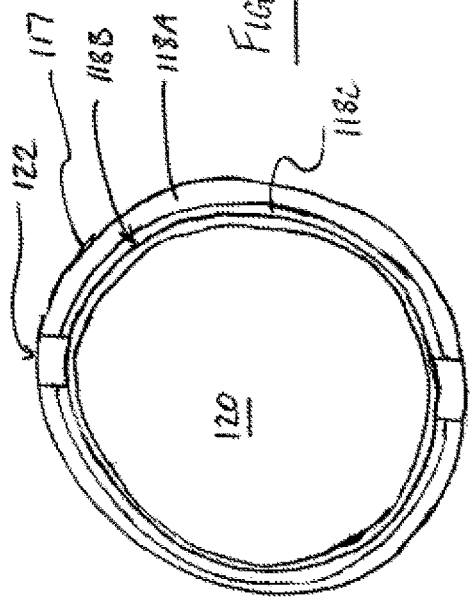
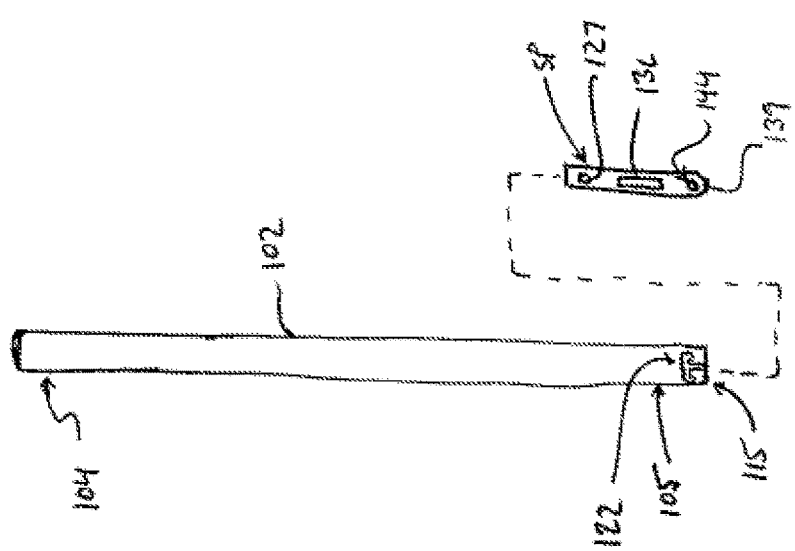

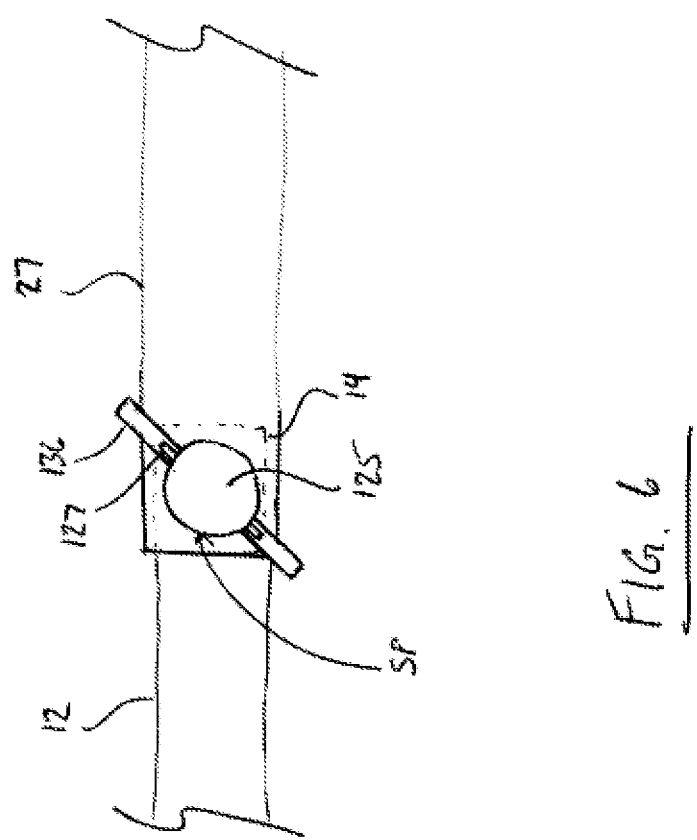

SYSTEM COMPRISING HANDHELD TOOL AND WINGED PIN FOR SINGLE-USER COUPLING OF TRACTOR DRAWBAR TO IMPLEMENT HITCH TONGUE AND RELATED METHOD

This application claims the benefit under 35 U.S.C. 119(e) of U.S. Provisional Application Ser. No. 63/177,538 filed Apr. 21, 2021.

FIELD OF THE INVENTION

The present invention relates to a system for coupling a tractor drawbar to an implement hitch tongue, and more particularly to such a system comprising a handheld tool and an optional winged pin to hitch the tractor and the implement, which tool can be used by an operator of the tractor without leaving a cab thereof.

BACKGROUND

Hitching of a drawn implement to a tractor acting as a prime mover is typically completed by multiple individuals, one who is operating the tractor to align a drawbar of the tractor with a hitch tongue of the implement, and another, typically standing on a ground surface, to insert a swivel pin when the tractor drawbar and the implement hitch tongue are in an aligned coupling configuration, that is when the drawbar and hitch tongue are in an aligned configuration suitable for coupling.

Alternatively, remotely actuated mechanical systems for coupling are available, such as those described in U.S. Pat. No. 7,530,592, U.S. Patent Application Publication 2009/0230657, and U.S. Patent Application Publication 2018/0215213, which enable single-user hitching.

SUMMARY OF THE INVENTION

According to an aspect of the invention there is provided a system for hitching a tractor and a towable implement, wherein the tractor includes a drawbar having a pin-receiving portion configured to receive a swivel pin and an operator cab arranged to receive an operator to control the tractor, and wherein the implement includes a hitch tongue configured to matingly align with the pin-receiving portion of the drawbar in an aligned coupling configuration of the drawbar and hitch tongue and wherein the hitch tongue is configured to receive the swivel pin to mate the drawbar and the hitch tongue when arranged in the aligned coupling configuration, the system comprising:

a handheld tool for inserting the swivel pin through the pin-receiving portion of the drawbar and the hitch tongue when arranged in the aligned coupling configuration, wherein the handheld tool has an upper end configured for gripping by a user and a lower end configured to removably receive the swivel pin;

wherein the handheld tool is configured to extend from the operator cab of the tractor to the pin-receiving portion of the drawbar of the tractor so that the handheld tool is usable by the operator to hitch the tractor and the implement with the swivel pin without leaving the operator cab.

This provides a simple arrangement for single-user manual hitching of a tractor to a towable implement. Using this system, the user can remain in the operator cab of the tractor during hitching, which may provide a more efficient hitching procedure, since the user or operator does not have leave the operator cab for hitching, which furthermore enables the operator to maneuver the tractor into suitable alignment with the implement for hitching. Furthermore, the hitching procedure becomes safer as the user can be positioned in spaced relation to the drawbar and hitch tongue, with the handheld tool effectively forming an extension of the user's arm.

In the illustrated arrangement, the handheld tool comprises an upstanding lower portion defining the lower end and an inclined upper portion defining the upper end, wherein the lower portion extends generally vertically upwardly from the lower end and defines an axis, and wherein the upper portion extends upwardly and outwardly, relative to the axis, from the lower portion to the upper end.

In the illustrated arrangement, the upper portion is substantially linear.

In the illustrated arrangement, the lower portion is substantially linear.

In the illustrated arrangement, the upper portion is inclined at an angle less than about 45 degrees from the axis.

In one arrangement, the upper and lower portions are pivotally interconnected for relative pivotal movement about a transverse axis crosswise to the axis of the lower portion such that an angle of the upper portion relative to the axis of the lower portion is adjustable.

In one such arrangement, the upper and lower portions are pivotally interconnected at an adjustable joint, wherein the adjustable joint comprises an arcuate slot and a transverse shaft slidably received therein for movement along the slot.

In the illustrated arrangement, the upper portion is longer than the lower portion as measured from a corresponding one of the upper and lower ends to a transition between the upper portion and the lower portion.

In the illustrated arrangement, the upper portion is about two times to about four times longer than the lower portion.

In the illustrated arrangement, the lower end is configured to removably receive the swivel pin coaxially of a substantially linear lower portion of the handheld tool which defines the lower end.

In the illustrated arrangement, the lower end comprises a receptacle configured to receive the swivel pin, which comprises:

a peripheral wall encompassing an axis of the handheld tool and having a free end delimiting an opening, wherein the peripheral wall is sized and shaped to receive therein the swivel pin in coaxial orientation relative to the handheld tool;

a backing element disposed in axially spaced relation to the opening and biased towards the opening, and at least one retention element arranged to hold the swivel pin in biased butting engagement with the backing element.

In the illustrated arrangement, the swivel pin comprises a cylindrical body defining a pin axis and a pair of diametrically-opposite retention arms adjacent a first end of the body and extending outwardly from the body, and wherein the at least one retention element of the receptacle comprises a pair of diametrically opposite slots in the peripheral wall configured to matingly receive the arms.

In the illustrated arrangement, the slots are configured to rotatably releasably secure the swivel pin in the receptacle.

In the illustrated arrangement, each of the slots comprises an axial portion extending from the free end of the peripheral wall and towards the backing element, and a transverse portion in communication with the axial portion and extending generally circumferentially of the axis, wherein the transverse portion is arranged such that the backing element is urged away from the opening by the swivel pin.

In the illustrated arrangement, each of the slots comprises a pair of the transverse portions, each one of the pair of the transverse portions extending in an opposite circumferential direction.

In the illustrated arrangement, each slot further comprises a locking portion in communication with the transverse portion and extending axially towards the opening to cooperate with the backing element to releasably secure the swivel pin in the receptacle.

In the illustrated arrangement, the swivel pin additionally includes at least one bracing arm intermediate the pair of retention arms and a second end of the cylindrical body and extending outwardly and towards the second end for engaging the hitch tongue of the implement.

In the illustrated arrangement, each bracing arm comprises a first portion extending generally radially from the body and a second portion extending generally parallel to the axis of the body.

According to another aspect of the invention there is provided a method for hitching a tractor and a towable implement comprising:

using a handheld tool which is distinct from a drawbar of the tractor and to which a swivel pin is releasably secured, locating the swivel pin through the drawbar and a hitch tongue of the implement aligned therewith, by reaching out from an operator cab of the tractor with the handheld tool.

In the illustrated arrangement, locating the swivel pin comprises:

inserting the swivel pin through the aligned drawbar and hitch tongue; and rotating the handheld tool to release the swivel pin from the handheld tool.

BRIEF DESCRIPTION OF THE DRAWINGS

The invention will now be described in conjunction with the accompanying drawings in which:

FIG. 2 is a schematic elevational view of an arrangement of system according to the present invention;

FIG. 3 is another schematic elevational view of the arrangement of FIG. 2;

FIG. 4 is a lower end view of the arrangement of FIG. 2;

FIG. 5 is a cross-sectional view along line 5-5 in FIG. 2;

FIG. 6 is a top plan view of a swivel pin inserted in a drawbar and hitch tongue aligned therewith;

In the drawings like characters of reference indicate corresponding parts in the different figures.

DETAILED DESCRIPTION

Figure 1:
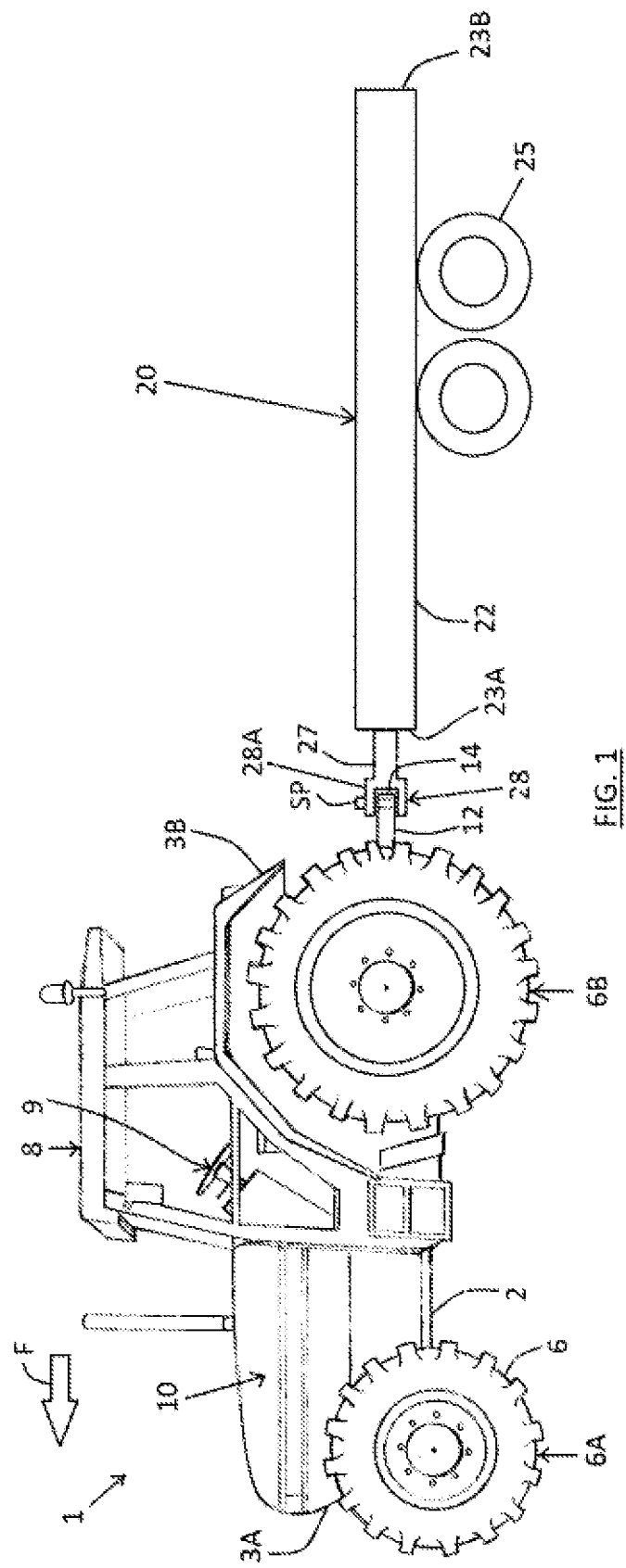
FIG. 1 shows a tractor and towable implement that are hitched.
Figure 7:
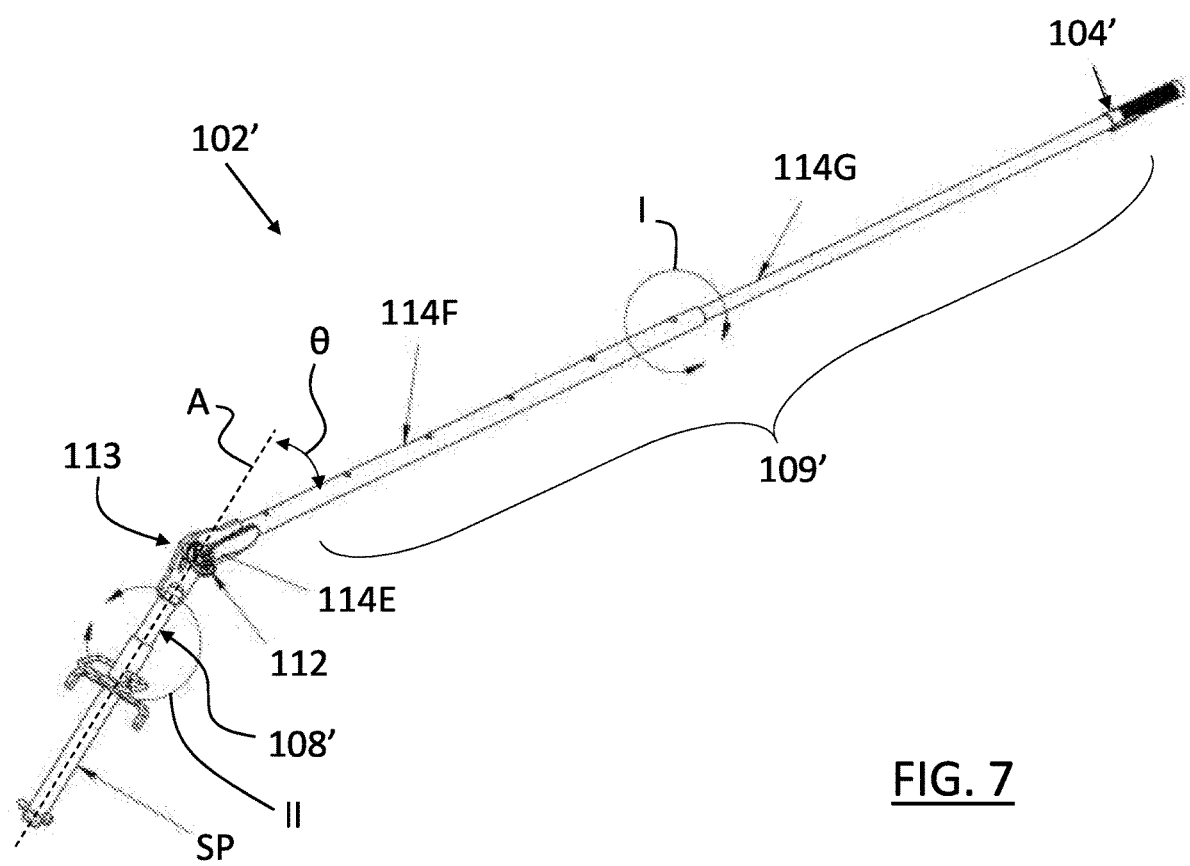
FIG. 7 is a perspective view of another arrangement of system according to the present invention.

The accompanying figures show a system 100 for hitching a tractor 1, which defines a self-propelled prime mover, and a towable implement 20, which generally requires a source of propulsion to move across a support surface.

The tractor 1 comprises a frame 2 which has longitudinally opposite front and rear ends 3A, 3B and laterally opposite sides (only one of which is shown). The tractor frame 2 is arranged for movement across a support surface such as the ground; in the illustrated arrangement, a plurality of wheels 6, which define traction elements, are rotatably mounted on the frame 2, and are generally arranged in pairs to form a front pair 6A of the wheels at or adjacent the frame front end 3A and a rear pair 6B of the wheels at or adjacent the rear end 3B, to rollably support the frame 2 in movement across the ground surface.

The tractor 1 includes an operator cab 8 supported on the frame 2 and arranged to receive a human operator to control the tractor. Thus, the cab 8 also generally includes a plurality of controls 9 for controlling operation of the tractor, for example movement thereof in forward and rearward travel directions, so as to include a steering wheel and drive pedals, and power-take off. The cab 8 may be open or enclosed as shown in FIG. 1. Typically, the cab 8 is located at or adjacent the rear end 3B of the frame and an engine 10, which is operatively coupled to the traction elements to drive same, is supported forwardly of the cab 8. A drawbar 12 of the tractor is coupled to the frame 2, typically at the rear end 3B and located generally laterally centrally of the frame 2, to project rearwardly. The drawbar 12 is also supported lower on the frame 2 than the cab 8 so as to be located at a lower height relative to the support surface. The drawbar 12 comprises a pin-receiving portion 14 in the form of a through-hole configured to receive a swivel pin SP at a location spaced rearwardly of the rear end 3B of the frame as well as from the cab 8.

Turning now to the implement 20, there is provided a frame 22 with longitudinally opposite front and rear ends 23A, 23B and laterally opposite sides (only one of which is shown). The implement frame 22 comprises a plurality of traction elements 25 in the form of wheels operatively mounted on the frame 22, at least one on each side 24A or 24B, and which are configured to support the frame in rolling movement across the support surface. At the front end 23A of the frame 22, the implement 20 has a hitch tongue 27 projecting forwarding therefrom and configured to matingly align with the pin-receiving portion 14 of the tractor drawbar 12 in an aligned coupling configuration of the drawbar and hitch tongue, as shown more clearly in FIG. 1. In the illustrated arrangement, the hitch tongue 27 forms a yoke at its free forward end 28 that is arranged in a vertical plane such that opposite arms or legs thereof are arranged in spaced relation generally one vertically above the other. Furthermore, the hitch tongue 27 is configured to receive the swivel pin SP to mate the drawbar 12 and the hitch tongue 27 when arranged in the aligned coupling configuration. In the illustrated arrangement, an upper leg 28A of the yoke has a hole configured to permit passage of the swivel pin SP. Thus, the implement 20 can be hitched to the tractor 1 for towing in trailing relation, rearwardly of the tractor, as the tractor is displaced in a forward working direction F. When hitched, the swivel pin SP defines a substantially vertical pivot axis between the hitched configuration of tractor and trailing implement enabling the same to be more easily steered.

To facilitate hitching of the tractor 1 and the implement 20, the system 100 comprises a handheld tool 102, which is distinct from the drawbar 12, for inserting the swivel pin SP through the pin-receiving portion 14 of the drawbar 12 and the hitch tongue 27 when they are arranged in the aligned coupling configuration. The handheld tool 102 has an upper end 104 configured for gripping by a human user, for example in that the upper end is sized and shaped to fit in a human hand, and a lower end 105 configured to removably receive the swivel pin SP. The handheld tool 102 is configured to extend from the operator cab 8 of the tractor to the pin-receiving portion 14 of the drawbar of the tractor so that the handheld tool is usable by the operator acting as the user to hitch the tractor and the implement with the swivel pin without leaving the operator cab. In other words, and more particularly, the handheld tool 102 is sized and shaped to substantially bridge a distance from the cab 8 to the drawbar 12. As such, the tractor 1 and implement 20 can be hitched by a single user operating the tractor without leaving same simply by reaching out from the operator cab with the handheld tool to locate the swivel pin through the drawbar and the hitch tongue aligned therewith.

In the illustrated arrangements, the handheld tool 102 comprises an upstanding lower portion 108 defining the lower end 105 and an inclined upper portion 109 defining the upper end 104. In general, the tool follows a curved or bent path between its opposite ends 104, 105 to reach from the cab 8 to the drawbar 12 which is both horizontally and vertically spaced from the cab, specifically rearwardly and downwardly thereof. The lower portion 108 extends generally vertically upwardly from the lower end 105 and defines an axis A, and the upper portion 109 extends upwardly and outwardly, relative to the axis A, from the lower portion 108 to the upper end 104. The lower portion 108 extends generally vertically in that a top thereof is located above but not necessarily vertically in-line or over its bottom defined by the end 104. In the illustrated arrangement, both the lower and upper portions 108, 109 are substantially linear in shape from corresponding ends 104, 105 to an intermediate transition 112 along the tool. The upper portion 109 is inclined at an angle $\theta$ from the axis A that in the illustrated arrangement is less than about 45 degrees. In the illustrated arrangement of FIGS. 1-5, the angle $\theta$ is fixed because the upper and lower portions of the handheld tool are rigidly or fixedly interconnected; however, in alternative arrangements of handheld tool, such as that of FIGS. 7-10 which is indicated at 102', the upper and lower portions 109', 108' are pivotally interconnected, for example at intermediary point or transition 112, such that the angle of inclination $\theta$ of the upper portion is adjustable in a range from 0 to about 45 degrees from the axis A defined by the lower portion 108.

In the illustrated arrangement of FIGS. 7-10, the handheld tool 102' comprises an adjustable joint 113 between the upper and lower portions 109', 108' to pivotally interconnect the same for relative pivotal movement about a transverse axis T oriented crosswise to the axis A of the lower portion, such that the inclination angle $\theta$ of the upper portion is adjustable relative to the axis A. In the illustrated arrangement, the relative pivotal movement of the upper and lower portions occurs in an upstanding common plane in which both portions are disposed and which contains the axis A. Preferably, the transverse axis T is normal to this common upstanding plane.

Figure 8:
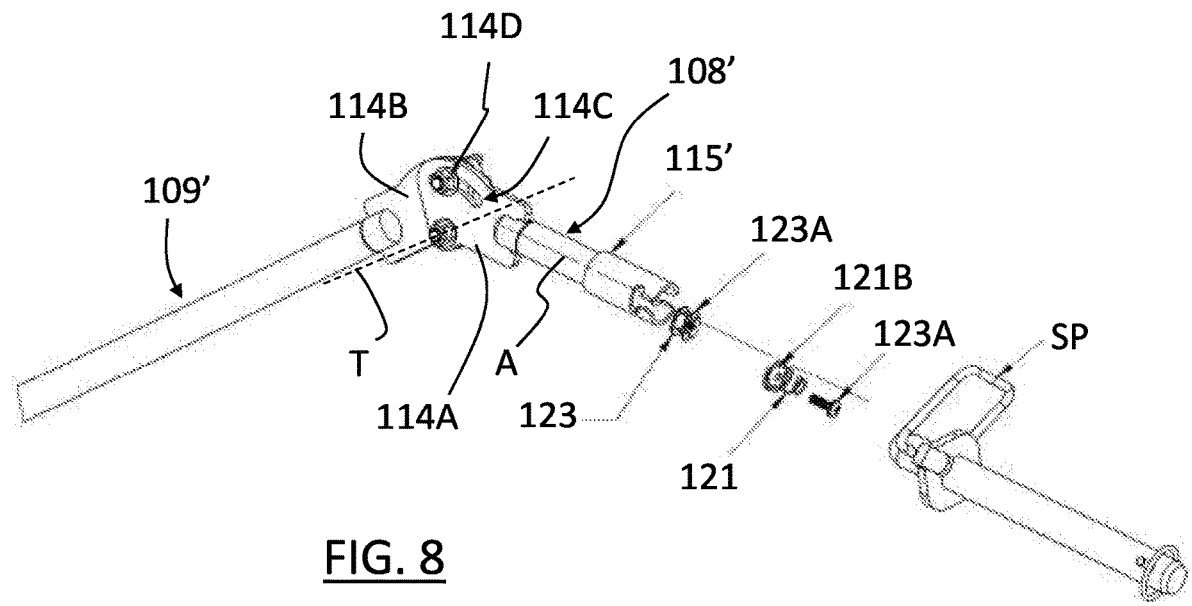
FIG. 8 is an exploded view of a portion of the system of FIG. 7.

More specifically, and with reference to FIG. 8, the adjustable joint 113 comprises a pair of parallel planar elements such as ear tabs 114A, 114B respectively connected in fixed relation to one of the lower and upper portions 108', 109'. The ear tabs 114A, 114B are arranged face-to-face in abutment with one another. Each ear tab is (laterally) offset from a central axis defined by each of the corresponding portions so that the portions are coplanar through a range of the pivotal movement. The ear tab 114A connected to the lower portion 108' locates an arcuate slot 114C, which slidably receives a transverse shaft 114D in the form of a pin carried by the ear tab 114B of the upper portion 109'. The slot 114C therefore defines the range of pivot movement of the upper portion 109' relative to the lower portion 108'. The adjustable joint 113 includes a clamp mechanism 114E of a conventional configuration incorporated in the pin defining shaft 114D, which secures the joint 113 in a desired position to fix the angle of inclination $\theta$ after adjustment.

Figure 9:
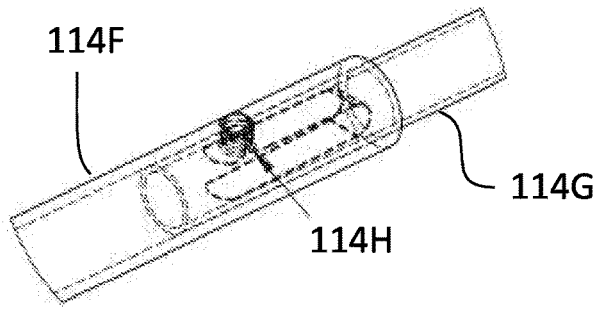
FIGS. 9 and 10 are enlarged partial views of areas indicated at I and II in FIG. 7.
Figure 10:
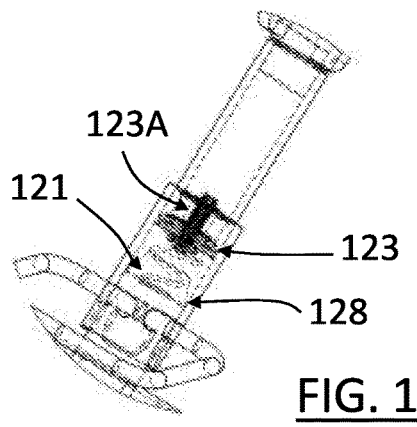

For suitable reach from the operator cab, the upper portion 109 is longer than the lower portion 108 as measured from a corresponding one of the upper and lower ends 104, 105 to a transition at 112 between the upper portion and the lower portion. In the illustrated arrangement, the upper portion 109 is about two times to about four times longer than the lower portion 108. Furthermore, in other arrangements such as that of FIGS. 7-10, the upper portion 109' is configured to be adjustable in length between the transition 112 and the upper end 104' by providing an upper portion with a telescoping configuration of interconnected graduated members 114F and 114G. FIG. 9 shows how the graduated members 114F and 114G are interconnected by apertures and depressible pin 114H carried on a movable one of the graduated members 114G.

The handheld tool 102 of the first arrangement of FIG. 2 is formed from an elongate rigid body, for example a metallic bar or tubing, which is bent at a location closer to one of two ends than to the other in order to provide the upper and lower portions which have different length.

In addition to providing suitable reach so as to bridge a distance between the cab 8 and the drawbar 12, the lower end 104 comprises a receptacle 115 configured to receive the swivel pin so that the tool is operable to suitably position the pin into mating relation for hitching.

More specifically, and with reference to FIG. 5, the receptacle 115 comprises a peripheral wall 117 encompassing the axis A of the handheld tool and having a free end 118A delimiting an opening 118B. The peripheral wall 117 is sized and shaped to receive therein the swivel pin SP in coaxial orientation relative to the handheld tool, and more specifically, coaxially of the substantially linear lower portion 108. The peripheral wall 117 is circular cylindrical in shape. The free end 118A has a beveled inner edge 118C so as to provide a ramped surface to guide the pin into the receptacle 115.

Furthermore, the receptacle 115 includes a backing element 120, which is disposed in axially spaced relation to the opening 118B and biased towards same. In the illustrated arrangement of FIG. 5, the backing element is in the form of a plate, which is biased towards the opening 118B by a biasing element distinct thereto, such as a compression spring 121, which is connected at one end in fixed relation to the lower portion 108 of the tool 102 and at the other end to the backing element 120. Alternatively to the plate, the backing element 120 may be a proximal end 121A of the biasing element 121, which is proximal to the opening 118B, as shown in FIG. 8. In other words, in such other arrangements, there may be no backing plate 120, and instead just the biasing element 121 with the end 121A which is free for engagement with the swivel pin SP.

With reference to FIG. 8, when the receptacle is in the form of a tubular member so as to have a hollow interior, the biasing element 121 may be secured in fixed location within the receptacle by a nut 123 which frictionally engages an interior wall of the receptacle. For example, the nut comprises a plurality of bendable tabs 123A arranged circumferentially of the nut, which are deformed upon insertion of the nut 123 into the peripheral wall 117 of the receptacle 115'. The biasing element 121 is secured to the mounting nut by a fastener 123A such as a screw, passed through a base plate attached to a distal end 121B of the biasing element (relative to the opening 118B). This is shown more clearly in FIG. 10.

Further to the backing element 120, there is provided at least one retention element 122 of the receptacle 115 that is arranged to hold the swivel pin in biased butting engagement with the backing element 120. More specifically, the backing element 120 is movable by contact with the swivel pin SP between an idle position, in which the plate 120 is disposed at a prescribed axial spacing from the opening 118B, and a depressed position in which the plate 120 is located farther from the opening 118B along the axis A. When the backing element 120 is displaced from the idle position in a direction away from the receptacle opening 118B, the element 120 is actively urged back to the idle position by the biasing element 121.

To satisfactorily cooperate with the handheld tool for single-user hitching, the system 100 includes the swivel pin, which is different from a conventional swivel pin, so to be configured to cooperate with the lower end 105 of the tool 102. More specifically, the swivel pin SP of the system 100 comprises a circular cylindrical body 125 defining a pin axis PA, like a conventional swivel pin, and, unlike a conventional swivel pin, a pair of diametrically-opposite linear retention arms 127 adjacent a first end 128 of the body 125 and extending substantially radially outwardly from the body. Accordingly, the at least one retention element 122 of the receptacle 115 comprises a pair of diametrically opposite slots in the peripheral wall 117 configured to matingly receive the retention arms 127. In the illustrated arrangement, the slots 122 are configured so that mating is achieved by relative rotational movement between the pin SP and the tool 102. Thus, the slots are configured to rotatably releasably secure the swivel pin in the receptacle.

For mating with the swivel pin, each of the slots 122 comprises an axial portion 130 extending from the free end 118A of the peripheral wall, so as to be open like a mouth for admitting the arms 122, and further towards the backing element 120. The slots 122 each further comprise a transverse portion 131 in communication with the axial portion and extending generally circumferentially of the axis A, so as to be elongated in a transverse direction to the axial portion. In the illustrated arrangement, the transverse portion 131 is located in the peripheral wall in adjacent non-spaced relation to the backing element 120, to induce a larger range of axial movement in the backing element 120 when the retention arms 127 are located in the transverse portions of the slots. Thus, the transverse portion 131 is arranged such that the backing element 120 is urged away from the opening 1188 by the swivel pin releasably secured in the receptacle. As such, when the pin's retention arms are located in the transverse slot portions 131, the backing element 120 is biased by the swivel pin so as to urge the pin out of the receptacle, in other words to eject it from the receptacle.

Furthermore, each slot 122 comprises a locking portion 133 in communication with the transverse portion 131 and extending axially towards the opening 118B, that is away from the backing element 120. The locking portion 133 extends only partially towards the opening 118B, so as to be closed distal to the transverse portion 131. Furthermore, the locking portion 133 is disposed at a circumferentially spaced position from the axial portion 130 and at a terminus of the transverse portion. Thus, when the pin's retention arms reach the distal ends of the transverse portions 131, relative to the axial portion 130, the arms are automatically urged axially outwardly by the backing element, such that the backing element 120 and the locking portions 133 of the slots cooperate to releasably secure the swivel pin in the receptacle 115 in fixed relation to the tool 102.

For left or right-handed operation of the tool, each of the slots 122 comprises a pair of the transverse portions 131 each one of which extends in an opposite circumferential direction. Accordingly, the slots 122 are generally T-shaped.

Thus, it will be appreciated that by relative rotational movement of the pin to the tool 102 about the tool axis A, the swivel pin SP can be releasably secured in the tool receptacle 115 by cooperation of the retention arms 127 and the receptacle slots 122. Relative rotation allows the retention arms 127 to be displaced through the transverse slot portions 131, at the end of which is provided the locking portion 133, where the pin can be held in fixed rotational relation, and axial relation, to the tool 102.

To release the swivel pin so secured, the pin SP additionally includes at least one bracing arm 136 intermediate the pair of retention arms 127 and a second end 139 of the cylindrical body and extending outwardly and towards the second end 139 for engaging the hitch tongue 27 of the implement. More specifically, each bracing arm 136 comprises a first radial portion 140A extending generally radially from the body and a second parallel portion 140B extending generally parallel to the axis PA of the pin body. The parallel portions 140B are coplanar with the pin axis PA. In the illustrated arrangement, there are provided a pair of the bracing arms in diametrically opposite relation. Thus, the bracing arms 136 are arranged to engage outer side surfaces of the hitch tongue upon rotation of the assembly of tool and pin received therein. This acts to stop rotation of the pin relative to the hitch tongue, so that when the tool 102 is urged axially forwardly against The bracing arms 136 are angularly offset from the tool's upper end 104 relative to the axis of the handheld tool when the pin is releasably secured in the receptacle. This may be provided, for example, by angularly misaligning or offsetting the axial portions 130 of the retention slots relative to a direction in which the upper end 104 generally radially extends from the axis A.

The second end 139 of the pin defining a lower end thereof when the swivel pin SP is arranged to mate the drawbar and hitch tongue has a beveled outer edge to provide a circumferentially extending ramped surface to guide the second end into aligned apertures or openings of the drawbar and hitch tongue when in the aligned mating configuration. Furthermore, adjacent the lower end 139 of the pin, there is provided a transverse passageway 144 configured for receiving a keeper pin to act to retain the swivel pin SP in the mated configuration of the tractor and implement.

In use, prior to hitching, the swivel pin SP is releasably secured in the receptacle 115, which in the illustrated arrangement is achieved by mating the retention arms 127 in the slots. This includes axially inward displacement of the swivel pin SP into the receptacle 115, and subsequent rotation of the pin relative to the receptacle about the tool axis A so that the arms 127 are received in the locking portions 133 of slots 122.

After the pin SP, in mated relation with the tool 102, is located in aligned openings of the drawbar 12 and hitch tongue 27, the tool 102 is initially displaced downwardly, moving the lower end 105 towards the aligned drawbar and hitch tongue, to depress the backing element 120 to remove the pin arms 127 from the locking portions 133 of the slots 122. Then, the tool 102 is rotated about the pin axis PA to cause the pin bracing arms 136 to engage outer surfaces of either the hitch tongue 27 and/or the drawbar 12. The tool 102 is further rotated in the same rotational direction, while the bracing arms 136 remain in contact with the hitch tongue and/or drawbar to cease rotation of the pin, to position the retention arms 127 in circumferential alignment with the axial portions 130 of the slots, such that the backing element 120 acts to eject the pin SP from the receptacle by pushing the tool 102 upwardly and away from the hitch tongue, thereby leaving the swivel pin in mating relation with the aligned drawbar and hitch tongue.

In order to remove the mated pin to detach or decouple the implement from the tractor, a reverse process is followed to that for releasing the pin once located in the aligned drawbar and hitch tongue.

This provides a simple arrangement for single-user manual hitching of a tractor to a towable implement. Using this system, the user can remain in the operator cab of the tractor during hitching, which may provide a more efficient hitching procedure, since the user or operator does not have leave the operator cab for hitching, which furthermore enables the operator to maneuver the tractor into suitable alignment with the implement for hitching. Furthermore, the hitching procedure becomes safer as the user can be positioned in spaced relation to the drawbar and hitch tongue, with the handheld tool effectively forming an extension of the user's arm. As such, the tool may also be used by a user standing on the ground or support surface adjacent but in spaced relation from the aligned drawbar and hitch tongue to insert the swivel pin from a safe distance without risk of being pinched between vehicles.

There is also provided a method for hitching a tractor 1 and a towable implement 20 comprising:

aligning a drawbar 12 of the tractor and a hitch tongue 27 of the implement for subsequent hitching, by maneuvering the tractor relative to the implement detached therefrom;

with the tractor and the implement aligned for hitching, using a handheld tool 100 which is distinct from the tractor drawbar 12 and to which a swivel pin SP is releasably secured, locating the swivel pin SP through the drawbar 12 and the hitch tongue 27 of the implement aligned therewith, by reaching out from an operator cab 8 of the tractor with the handheld tool.

More specifically, the step of locating the swivel pin comprises inserting the swivel pin through the aligned drawbar and hitch tongue and rotating the handheld tool to release the swivel pin from the handheld tool, thereby leaving the pin in mating condition with the aligned drawbar and hitch tongue.

The system 100 may be used in various industries such as agricultural, construction or highway transport.

The scope of the claims should not be limited by the preferred embodiments set forth in the examples but should be given the broadest interpretation consistent with the specification as a whole.

The invention claimed is:

1. An apparatus for hitching a tractor to a towable implement, wherein the tractor includes:
an operator cab arranged to receive a tractor operator to control the tractor;
and a drawbar having a hitch swivel pin-receiving portion,
and wherein where the implement includes:
a hitch tongue configured to matingly align with the hitch swivel pin-receiving portion of the drawbar in an aligned coupling configuration of the drawbar and the hitch tongue;
the apparatus comprising:
a hitch swivel pin for engaging the drawbar and the hitch tongue when in the aligned coupling configuration;
wherein the hitch swivel pin comprises a cylindrical pin body having an axis longitudinally thereof including an upper end of the cylindrical pin body for positioning above the hitch swivel pin and drawbar when in the aligned coupling configuration and a lower end for engaging into the drawbar and the hitch tongue when in the aligned coupling configuration;
wherein the hitch swivel pin includes at least one retention member extending outwardly from the longitudinal axis of the cylindrical pin body at a position at or adjacent the upper end;
a handheld tool for inserting the hitch swivel pin through the pin-receiving portion of the drawbar and the hitch tongue when arranged in the aligned coupling configuration;
wherein the handheld tool has a first end configured for gripping by the tractor operator in the operator cab and a second end having a receptacle to releasable engage the cylindrical pin body of the hitch swivel pin;
wherein the handheld tool is configured to extend from first end at the operator cab of the tractor to the second end at the pin-receiving portion of the drawbar of the tractor for reaching the hitch swivel pin received in the pin-receiving portion of the drawbar so as to hitch the tractor and the implement with the hitch swivel pin without leaving the operator cab;
the receptacle of the handheld tool comprising at least one slot for receiving said at least one retention member to retain said at least one retention member an end portion of said cylindrical pin body in said receptacle;
said at least one retention member being releasable from said at least one slot by rotation of said receptacle relative to the cylindrical pin body around the longitudinal axis;
wherein the hitch swivel pin additionally includes at least one bracing arm intermediate said at least one retention member and the lower end of the cylindrical pin body, wherein said at least one bracing arm includes a first generally radial portion which extends generally radially outwardly of the longitudinal axis and includes a second generally parallel portion which extends generally longitudinally of the longitudinal axis towards the lower end for engaging at least one of the hitch tongue and the drawbar to prevent rotation of the cylindrical pin body around the longitudinal axis when the receptacle is rotated around the longitudinal axis.

2. The apparatus of claim 1 wherein the handheld tool comprises an upstanding lower portion at the second end and an inclined upper portion at the first end, wherein the lower portion extends generally vertically upwardly from the first end along the longitudinal axis, and wherein the upper portion extends upwardly and outwardly, relative to the longitudinal axis, from the lower portion to the first end.

3. The apparatus of claim 2 wherein the upper portion is substantially linear.

4. The apparatus of claim 2 wherein the lower portion is substantially linear.

5. The apparatus of claim 2 wherein the upper portion is inclined at an angle less than about 45 degrees from the longitudinal axis.

6. The apparatus of claim 2 wherein the upper and lower portions are pivotally interconnected for relative pivotal movement about a transverse longitudinal axis such that an angle of the upper portion relative to the longitudinal axis of the lower portion is adjustable.

7. The apparatus of claim 1 wherein the receptacle comprises a peripheral wall around the longitudinal axis with a free end defining an opening, wherein the peripheral wall is sized and shaped to receive therein the end portion of the cylindrical pin body of the hitch swivel pin and a spring biased backing element disposed in axially spaced relation to the opening and biased towards the opening arranged to hold said at least one retention member in said at least one slot.

8. The apparatus of claim 7, wherein said at least one retention member comprises a pair of diametrically-opposite retention arms and said at least one slot of the receptacle comprises a pair of diametrically opposite slots in the peripheral wall configured to matingly receive the retention arms.

* * * * *